United States Patent [19]

Fowler et al.

[11] 3,841,558

[45] Oct. 15, 1974

[54] ARRANGEMENT FOR IRRIGATING AND CONTROLLING TEMPERATURE AND HUMIDITY OF PLANTS

[75] Inventors: William Douglas Fowler, Terra Bella; Paul Brookman, Porterville, both of Calif.

[73] Assignee: W. D. Fowler & Sons Corp., Terra Bella, Calif.

[22] Filed: Aug. 3, 1973

[21] Appl. No.: 385,317

Related U.S. Application Data

[60] Division of Ser. No. 196,978, Nov. 9, 1971, abandoned, which is a continuation-in-part of Ser. No. 173,154, Aug. 19, 1971, abandoned.

[52] U.S. Cl..................... 239/11, 47/2, 239/DIG. 1, 239/276, 239/468, 239/596
[51] Int. Cl........................................... B05b 17/04
[58] Field of Search ............ 239/11, 266, 276, 207, 239/590, 61, 62, 72, 562, 468, DIG. 1, 596; 47/48.5, 2

[56] References Cited
UNITED STATES PATENTS

| | | | |
|---|---|---|---|
| 1,007,793 | 11/1911 | Peabody | 239/494 |
| 2,003,520 | 6/1935 | Seeber | 47/2 |
| 2,644,720 | 7/1953 | Carr | 239/468 |
| 3,333,773 | 8/1967 | Hutchinson | 47/2 |
| 3,540,822 | 11/1970 | Filliol | 47/2 |

*Primary Examiner*—Lloyd L. King
*Attorney, Agent, or Firm*—Christie, Parker & Hale

[57] ABSTRACT

Irrigation of plants and control of the temperature and humidity of the air in the vicinity of plants is provided through the same water supply system. Nozzles located adjacent the plants along a water supply conduit are shaped to produce a small stream of water at low water pressure for irrigating the plants and to produce a fine spray or mist of water at high water pressure for temperature and humidity control. The pressure of the water which is supplied to the system is controlled to cause either irrigation or temperature and humidity control.

5 Claims, 8 Drawing Figures

PATENTED OCT 15 1974 3,841,558

INVENTOR.
WILLIAM D. FOWLER
BY PAUL BROCKMAN

Christie, Parker & Hale
ATTORNEYS 3,841,558

ARRANGEMENT FOR IRRIGATING AND CONTROLLING TEMPERATURE AND HUMIDITY OF PLANTS

CROSS REFERENCE TO RELATED APPLICATION

This is a division of application Ser. No. 196,978 filed Nov. 9, 1971, now abandoned, which is in turn a continuation-in-part of application Ser. No. 173,154 filed on Aug. 19, 1971, now abandoned.

BACKGROUND OF THE INVENTION

The invention relates to irrigation systems for supplying water to plants, such as trees in an orchard, and for also controlling the temperature and humidity of the air adjacent the plants.

Heretofore, the only practical arrangements for irrigating and controlling the temperature of air adjacent plants located in open air have employed separate systems operating on different media. The irrigation arrangements supply a stream of water to the plants, and the temperature of the air adjacent the plants is controlled by heating devices or by large fans which cause the air to circulate and thereby reduce the temperature at which frost or freezing occurs. These arrangements require a large capital investment and they are expensive to operate.

U.S. Pat. No. 1,058,566 discloses a system which provides either a stream of water for irrigation or a fine spray for temperature control with separate outlets controlled by a valve at each location for supplying the stream for irrigation or the fine spray. That system requires a substantial capital investment in equipment since each location requires a valve, and it suffers the disadvantage of requiring the manual operation of a valve at each plant location in order to convert from one mode of operation to the other. Hence, it is not practical for large groves, and apparently it never achieved significant use.

SUMMARY OF THE INVENTION

Water for irrigation or a fine spray for temperature and humidity control are provided in the present invention by employing a single nozzle at each location shaped to produce a small stream of water in response to low water pressure and to produce a fine spray in response to high water pressure. The nozzles are supplied with water through a system of pipes or hoses, and the pressure of the water which is supplied to the system is controlled so that water at low pressure is applied to the system when irrigation is desired and water at high pressure is applied to the system when temperature and humidity control is desired.

Such an arrangement is relatively inexpensive, and only one control location is required for each system, so that it is easy for an operator to change the system from one mode of operation to the other.

DESCRIPTION OF THE PREFERRED EMBODIMENT

Figure 1:
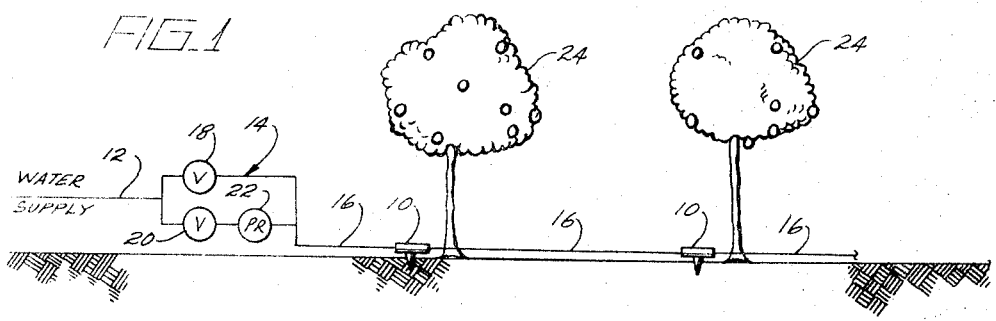
FIG. 1 shows an irrigation system in accordance with the invention.

FIG. 1 illustrates a preferred embodiment of the irrigation system. It employs a nozzle 10 located adjacent each plant to be irrigated. The nozzles are supplied with water from a main water supply line 12 through a pressure control means 14 and hoses or pipes 16 which may be made of plastic.

The pressure control means 14 which is illustrated in FIG. 1 employs a valve 18 for applying water to the irrigation system at the relatively high pressure of the water supply line 12, which is typically at a pressure of 40 to 80 pounds or more. The pressure control means also employs a valve 20 and a pressure reducer 22 for applying water to the irrigation system at relatively low pressure, such as 5 pounds.

Figure 2:
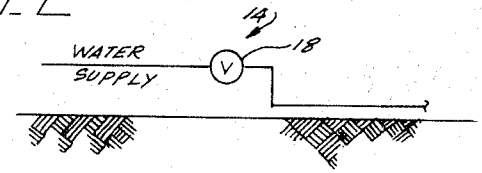
FIG. 2 shows an alternative arrangement for controlling the water pressure applied to the system.

FIG. 2 illustrates an alternative arrangement wherein the pressure control means 14 is a single valve 18 which may be opened wide to provide water to the irrigation system at high pressure and which may be opened partially to provide water to the irrigation system at low pressure.

FIG. 1, for simplicity, shows only two trees 24 to be irrigated and two nozzles 10 located adjacent the trees. It will be understood that the irrigation system may extend to a large number of plant locations, depending upon the size of the grove and the available water supply, and one or more nozzles for each plant, depending upon size and water requirement.

An important aspect of the invention is the use of an orifice at each irrigation location that is supplied with water through a system having a diameter that is many times larger. The diameter of the outlet should be large enough to pass grains of sand and the like that might clog the orifice. Such an orifice will issue a small stream of water at low water pressure at many locations with the amount of water applied at the respective locations being substantially the same so as to achieve uniform irrigation. Such an orifice can be arranged to issue a fine spray or mist of water when supplied with water at high pressure. Thus, the system can be converted from one mode of operation to the other at a single pressure control location, such as the location 14 illustrated on FIGS. 1 and 2.

Figure 3:
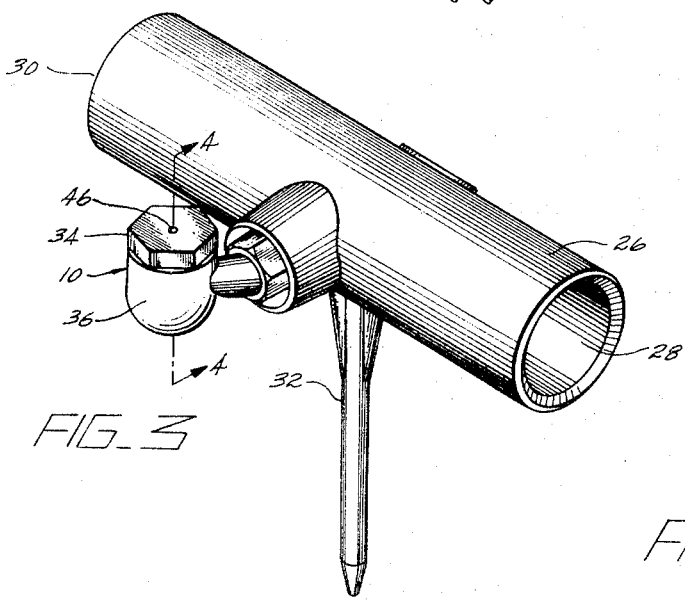
FIG. 3 is a perspective view of a nozzle and support suitable for use in the irrigation system.
Figure 5:
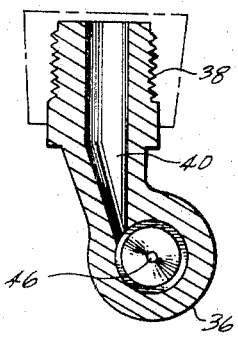
FIG. 5 is a horizontal cross section showing the nozzle taken along line 5—5 of FIG. 4.
Figure 4:
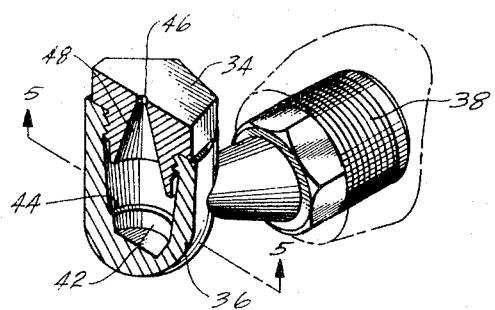
FIG. 4 is a vertical cross section showing the nozzle taken along 4—4 of FIG. 3.

FIGS. 3, 4, and 5 illustrate a nozzle arrangement which is similar to that disclosed in U.S. Pat. No. 2,247,897, which issued to F. W. Wahlin on July 1, 1941, for producing a hollow cone-shaped spray as discussed in that patent.

A conduit 26 upon which the nozzle is mounted has openings 28, 30 for coupling into the irrigation system, and a spike 32 for insertion into the ground to maintain the nozzle in an upright position. The conduit and spike may be made of plastic.

The nozzle 10 may also be made of plastic. It comprises a cap 34, that mates with a bowl 36 which has a threaded coupling 38 for connecting the nozzle to the conduit 26. A channel 40 communicates with the side of the chamber 42 of the bowl. A shoulder 44 extends around the bottom of the chamber 42 and it enhances the uniformity of the spray that is emitted from the nozzle. The cap has an orifice 46 which communicates with the chamber 42 through a cone-shaped opening 48. By way of example, the orifice 46 may be 1/32 inch in diameter and the conduit 26 may be coupled to conventional 3/8 or 1/2 inch plastic pipe or hose. The chamber 42, the cone-shaped opening 48, and the orifice 46 emit a small stream of water at low pressure. However, at high pressure they cooperate to emit a cone-shaped spray.

Figure 7:
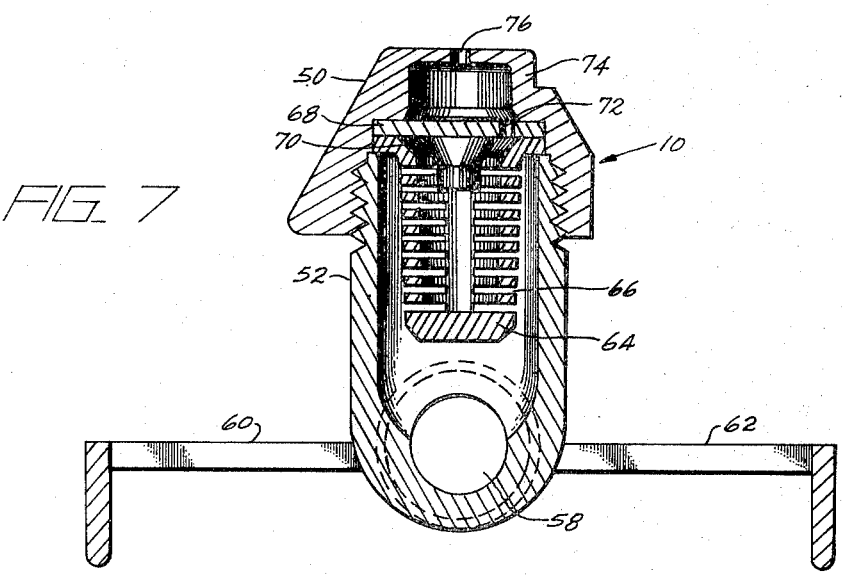
FIG. 7 is a vertical cross section showing the nozzle taken along line 7—7 of FIG. 6.
Figure 6:
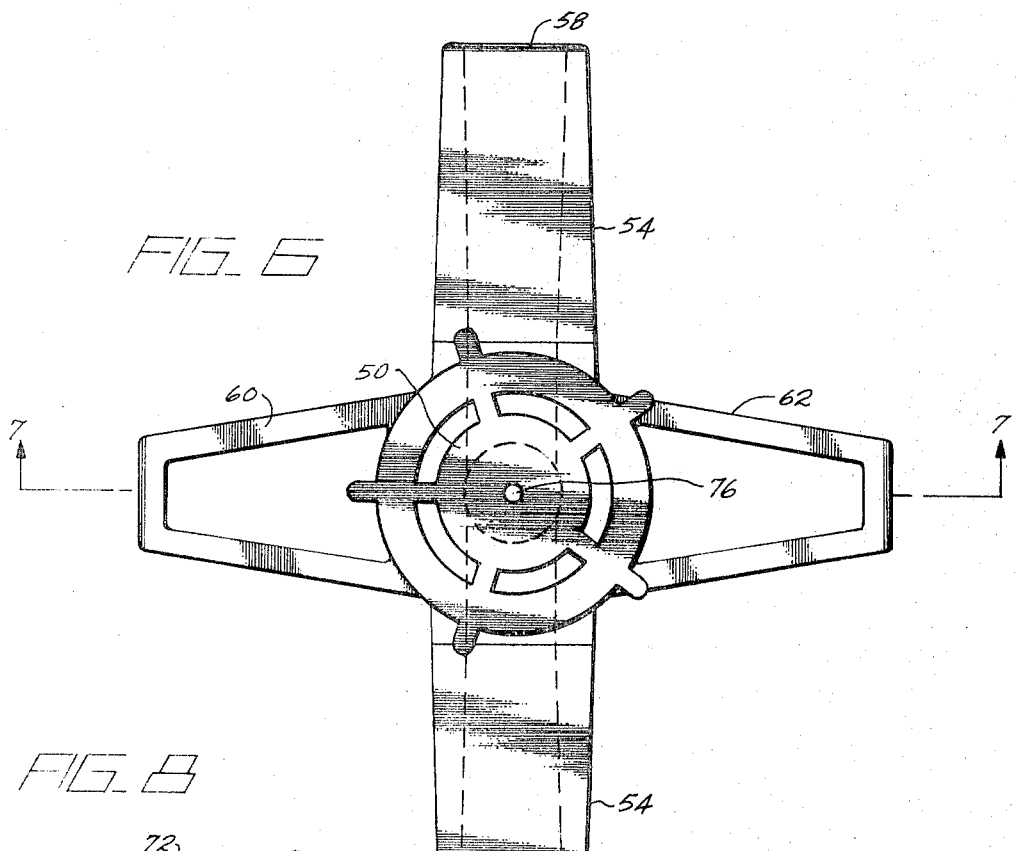
FIG. 6 is a top view of another nozzle and support suitable for use in the irrigation system.
Figure 8:
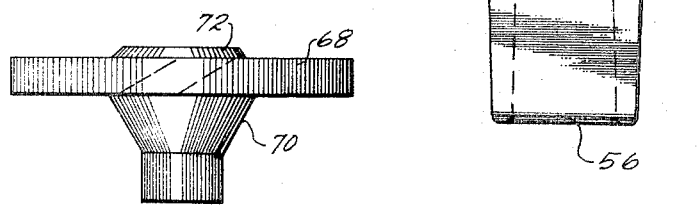
FIG. 8 is a side view of one of the components of the nozzle.

FIGS. 6–8 shows an alternative nozzle 10 that permits the use of a larger orifice, that provides a strainer to keep out particles that might clog the orifice, and that eliminates lateral air pockets along the sprinkler system that sometimes cause erratic operation at low pressure.

This nozzle comprises a cap 50 that mates with a bowl 52 through a threaded coupling. A conduit 54 having openings 56, 58 for coupling into the irrigation system opens into the interior of the bowl 52 so that water rises in the bowl 52 when pressure is applied. A pair of arms 60, 62 serve to maintain the nozzle in an upright position on the surface of the ground.

A strainer 64 has slots 66 which admit water from the bowl 52 to the interior of the strainer. At the top of the strainer is a barrier 68 having a cone-shaped protrusion 70 for directing the water to an inclined slot 72 which extends through the barrier. The slot 72 communicates with a chamber 74 which in turn communicates with the orifice 76.

As before, at low water pressure a small stream of water is emitted from the orifice 76. At high water pressure the passageway through the inclined slot 72 causes the water that is admitted to the chamber 74 to swirl around the chamber at a high speed and it is emitted from the orifice 76 as a cone-shaped spray.

By way of example, the orifice may be 0.050 inch in diameter and the slots 66 in the strainer 64 may be 0.025 inch in width. Thus, the strainer will not pass particles of dirt or sand that are large enough in diameter to clog the orifice 76.

The slot 72 may be inclined at a 33° angle with respect to the plane of the barrier 68 so as to give rapid swirling action.

The nozzle arrangement of FIG. 3 has the disadvantage that it extends laterally from the sprinkler system and sometimes air trapped inside the nozzle cavities prevents the flow of water into the nozzle at low water pressure. This difficulty is overcome by the nozzle arrangement of FIG. 7 because a portion of the water in the sprinkler system passes through a portion of the bowl 52 and the water will rise in the bowl and pass through the slot 72, the chamber 74 and the orifice 76 even at low water pressure.

In operation, when water at low pressure is provided through the pressure control means 14 to the respective nozzles 10 in the sprinkler system, a small stream of water is emitted from the nozzles. This irrigation may be contined for a long period of time, such as several hours, to provide deep penetration of water to the roots of the plants.

If humidity control is desired due to dry weather conditions, or if temperature control is desired due to either hot weather or freezing weather, water at high pressure is provided through the pressure control means 14 to the respective nozzles in the sprinkler system. A fine spray or mist is then emitted from the nozzles.

Temperature control in freezing weather serves to provide a few degrees of control. This is sufficient to protect plants, such as citrus trees, in areas having mild climates.

What is claimed is:

1. The method of selectively irrigating and controlling the temperature and humidity of plants through a water irrigation system for supplying water to orifices adjacent each plant from a water pressure control means coupled to a water supply, the water irrigation system containing a multiplicity of intercommunicating orifices comprising supplying water at a low pressure from the water pressure control means to the multiplicity of intercommunicating orifices of the irrigation system to the plants in a small stream to irrigate the plants, and alternatively supplying water at a high pressure to the multiplicity of intercommunicating orifices of the irrigation system to produce fine sprays of water adjacent the plants for temperature and humidity control.

2. The method of irrigating and controlling temperature through a water irrigation system coupled to a water supply through water pressure control means and having a multiplicity of intercommunicating nozzle means located along the system and pointed upwardly and shaped to produce a small stream of water at low water pressure and to produce a fine spray at high pressure, comprising reducing, at the water pressure control means, the pressure of the water in the irrigation system to a low pressure to selectively cause irrigation or switching, at the water pressure control means, the pressure of the water in the irrigation system to a high pressure to control temperature.

3. The method of irrigating and controlling temperature of plants through a water irrigation system coupled by water pressure control means to a water supply which comprises causing the irrigation system to simultaneously emit a small stream of water from each of a multiplicity of intercommunicating orifices at a low pressure to the ground adjacent the plants for irrigation by reducing water pressure to the water irrigation system at the water pressure control means, and alternatively causing the irrigation system to simultaneously emit a fine spray of water from each of the multiplicity of intercommunicating orifices to the air adjacent the plants at high water pressure by increasing water pressure to the water irrigation system at the water pressure control means for temperature control.

4. The method of irrigating and controlling temperature of plants through a water irrigation system comprising providing from a water pressure control means coupled to a water supply and the water irrigation system, high pressure hollow cone-shaped fine sprays of water at a multiplicity of locations adjacent plants to be protected from low temperature damage, or providing water at a low pressure from the water pressure control means to the system in small streams of water at each of said locations for irrigation to selectively cause irrigation or temperature control of a multiplicity of plants.

5. The method of irrigating and controlling temperature through a water irrigation system comprising producing in response to high pressure in the system a hollow cone-shaped fine spray at locations spaced from one another a distance equal to or greater than the maximum horizontal dimension of the cone-shaped spray so as to provide effective temperature control with a small amount of water and thereby avoid applying excessive water to the area being controlled, producing in response to low pressure in the system a small stream of water at each of said locations for irrigation, and controlling the pressure of the water in the irrigation system to selectively cause irrigation or temperature control.

* * * * *